US005988585A

United States Patent [19]
Eaton

[11] Patent Number: 5,988,585

[45] Date of Patent: Nov. 23, 1999

[54] MICROPHONE MOUNT

[75] Inventor: Robert L. Eaton, Ashtabula, Ohio

[73] Assignee: CTI Audio, Inc., Conneaut, Ohio

[21] Appl. No.: 08/800,923

[22] Filed: Feb. 13, 1997

[51] Int. Cl.[6] ........ F16M 1/00

[52] U.S. Cl. ........ 248/638; 248/559; 381/91

[58] Field of Search ........ 248/638, 559, 248/636, 562, 566; 379/431, 428; 381/91; D14/206

[56] References Cited

U.S. PATENT DOCUMENTS

| | | | |
|---|---|---|---|
| 3,153,123 | 10/1964 | Harman | 179/148 |
| 3,573,401 | 4/1971 | Lininger | 179/147 |
| 3,653,625 | 4/1972 | Plice | 248/358 R |
| 3,947,646 | 3/1976 | Saito | 179/146 R |
| 4,194,096 | 3/1980 | Ramsey | 179/147 |
| 4,453,045 | 6/1984 | Bruna | 179/146 |
| 4,514,598 | 4/1985 | Plice | 179/146 R |
| 4,955,578 | 9/1990 | Fidi | 248/559 |

*Primary Examiner*—Ramon O. Ramirez
*Assistant Examiner*—Kimberly Wood
*Attorney, Agent, or Firm*—Sand & Sebolt

[57] ABSTRACT

A microphone shock mount includes an inner housing, an outer housing extending around the inner housing and top and bottom dampeners which extend between the inner and outer housings. An annular groove is formed in an outer surface of the inner housing adjacent a top thereof and a stepped shoulder is formed in the outer surface of the inner housing adjacent a bottom thereof. A pair of stepped shoulders are formed in an inner surface of the outer housing adjacent a top and bottom thereof. The top and bottom dampeners are ring-shaped with a generally U-shaped cross-section. An annular rib extends inwardly from an inner portion of the top dampener and engages the groove of the inner housing. An outer portion of the top dampener engages the top stepped shoulder of the outer housing. The bottom coupling engages the bottom stepped shoulders of the inner and outer housings. A pair of axially aligned circular holes are formed in the inner and outer housings for receiving a stop pin which limits the vertical movement of the inner housing relative to the outer housing. A radial flange extends from a top edge of the outer housing for mounting the shock mount to a support surface.

29 Claims, 5 Drawing Sheets

MICROPHONE MOUNT

BACKGROUND OF THE INVENTION

1. Technical Field

Generally, the invention relates to microphone mounts. Particularly, the invention relates to a shock mount for gooseneck microphones which isolates the microphone from vibration while supporting the microphone on a podium or table. Specifically, the invention relates to a shock mount with an outer housing which mounts to the podium, an inner housing which supports the microphone and top and bottom resilient dampeners which suspend the inner housing within the outer housing.

2. Background Information

Microphone mounts are generally used to reduce vibrational noises that are induced into microphone systems from external mechanical sources. These vibrational noises travel readily through solid objects such as a podium or table upon which microphones are mounted. Conventional shock mounts use some type of elastomer or rubber to isolate the microphone housing from the internal transducer to reduce the vibrational pickup of the microphone. The elastomer absorbs the vibrations and converts a majority of the vibrations into heat energy, thus attenuating the vibrations to a large extent.

Also, low frequency vibrations cause noise in the microphones by setting the microphone into motion and inducing the noise through the motion of the microphone diaphragm itself. Since the diaphragm of any microphone has mass, and therefore inertia, the motion of the microphone causes the diaphragm of the microphone to move in relation to its mounting structure. This movement of the microphone produces an output voltage in response to the external vibration. Usually this type of vibrational noise is suppressed by reducing the resonant frequency of the microphone by either using very compliant elastomers, increasing the microphone's mass or usually a combination of both. If the resonant frequency is low enough, the vibrational noise may be below the normal 20 Hz lower frequency hearing limits. Usually, some type of dampening is used to reduce these low level vibrations.

Examples of various types of mounts used to dampen vibrations induced by external mechanical sources can be seen in U.S. Pat. No. 3,153,123 which discloses a stand for carrying a microphone. A plurality of vibration absorbing rubber rings are interposed between the microphone stand and the microphone carried thereby. The rings absorb vibrations and insulate the microphone from the stand.

U.S. Pat. No. 3,573,401 discloses a mount for a microphone in which a circular elastomeric body has an annular groove on one side to receive an annular portion of a microphone clamp assembly. A continuous groove is formed in the periphery of the elastomeric body which engages the edge of a correspondingly dimensioned opening in the base of the microphone stand. A groove is also formed in the opposite side of the elastomeric body to improve vibration insulation.

U.S. Pat. No. 3,653,625 discloses a microphone mounting apparatus which includes a compact resilient mounting member defining a socket. The socket is adapted to receive a microphone body and a support for supporting the mounting member. The mounting member defines an enclosed space encircling the socket that is preferably filled with a liquid or pressurized gas. The vibrations of the microphone are dampened to different degrees depending upon the viscosity of the gases or liquids within the mounting member.

U.S. Pat. No. 3,947,646 discloses a resilient microphone holder which includes a microphone supporting cylinder for mounting a microphone therein, an attaching cylinder located outside the supporting cylinder and a stepped connecting cylinder formed with supporting and attaching cylinders together. The microphone holder is formed of a resilient material which suspends the microphone and isolates the microphone against oscillations.

U.S. Pat. No. 4,194,096 discloses a microphone shock mount and assembly which includes upper and lower semi-cylindrical frames hingedly connected to one another at one edge thereof. Each frame includes a pair of closed elastomeric bands extending transversely around each end thereof. The microphone is suspended between the bands of the upper frame and the bands of the lower frame when the upper frame is latched to the lower frame. The mass of the microphone and the resiliency of the bands form a mechanical moving system with a resonance below the frequency range of the microphone.

U.S. Pat. No. 4,453,045 discloses a supporting arrangement for electro-acoustic transducers which includes a housing with a housing casing having a transducer within the casing and being supported by at least one elastic support ring provided between the transducer and the casing. The supporting ring is formed of electrically conducting material to provide electrical connection to the housing. The housing or a portion thereof provides an electrical terminal for connecting the electrical transducer to an energy source.

U.S. Pat. No. 5,514,598 discloses a microphone shock mounting apparatus designed for receiving and holding a microphone which isolates the microphone from surrounding structure-borne environmental vibration. The apparatus includes a cradle which flexes when opened to receive the microphone and which closes firmly around the microphone body to hold the microphone in place. The cradle permits the microphone to be received into and removed from the shock-mounting apparatus without requiring disconnection from the signal output cable.

U.S. Pat. No. 4,955,578 discloses a resiliently fastened support device for a microphone of a mass which is a multiple of the mass of the microphone and an arrangement carrying the microphone. The supporting device is either suspended in an outer container by a pair of springs attached to the top thereof or is supported on the bottom of the outer container by a spring attached to the bottom thereof. The resiliently mounted support device dampens mechanical vibrations and has a low resonance frequency which is at the lowest end or below the transmission range of the microphone.

Although these prior art microphone mounts are adequate for the purpose for which they were intended, these mounts fail to provide a dual point suspension Which vertically supports the microphone and which prevents a gooseneck microphone from tipping or leaning while mounted on a table or podium. Further, many of these prior art microphone stands are constructed to hold a microphone of a specific size or type and can not be used to hold other microphones.

Therefore, the need exists for an improved microphone mount which provides dual point suspension to vertically mount the microphone on a table or podium and to prevent tipping or leaning of the top-heavy gooseneck microphone, which holds a usual 3-pin disconnect connector to allow the microphone mount to be used with any microphone that has a 3-pin connector and which dampens noise induced from external mechanical vibrations.

SUMMARY OF THE INVENTION

Objectives of the invention include providing a microphone mount which provides a dual point suspension of the microphone to prevent tipping or leaning of the microphone.

Another objective is to provide such a mount which reduces noise induced in the microphone by external mechanical vibrations.

A further objective is to provide such a mount which includes a pair of couplings or dampeners molded of a specially formulated elastomeric material which dampen noise induced from low frequency vibrations.

Yet another objective is to provide a mount for a microphone which suspends the microphone which utilizes elastomeric material to suspend the microphone.

Still another object is to provide a mount for a microphone which provides a stop to prevent the microphone from linearly displacing to an extent which would damage the elastomeric dampener.

A further objective is to provide such a mount in which the elastomeric dampeners isolate the microphone by absorbing a majority of the external mechanical vibrational energy and converting the vibrations into heat energy.

A still further objective is to provide such a mount which suppresses vibrational noise caused by movement of the microphone in relation to the microphone's mounting structure.

Another objective is to provide such a mount which holds a quick disconnect connector which allows any microphone with a 3-pin connector be -.used therewith and which provides quick and easy installation and removal of the microphone for security.

A further objective is to provide such a mount which is relatively small in size and has a low profile when mounted to a podium or table.

These objectives and advantages are obtained by the improved microphone mount of the present invention, the general nature of which may be stated as including an inner housing adapted to be mounted to the microphone; an outer housing extending around at least a portion of the inner housing; a space extending intermediate the inner housing and the outer housing; and dampening means for isolating the microphone from vibration mounted intermediate the inner housing and the outer housing and within the space.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
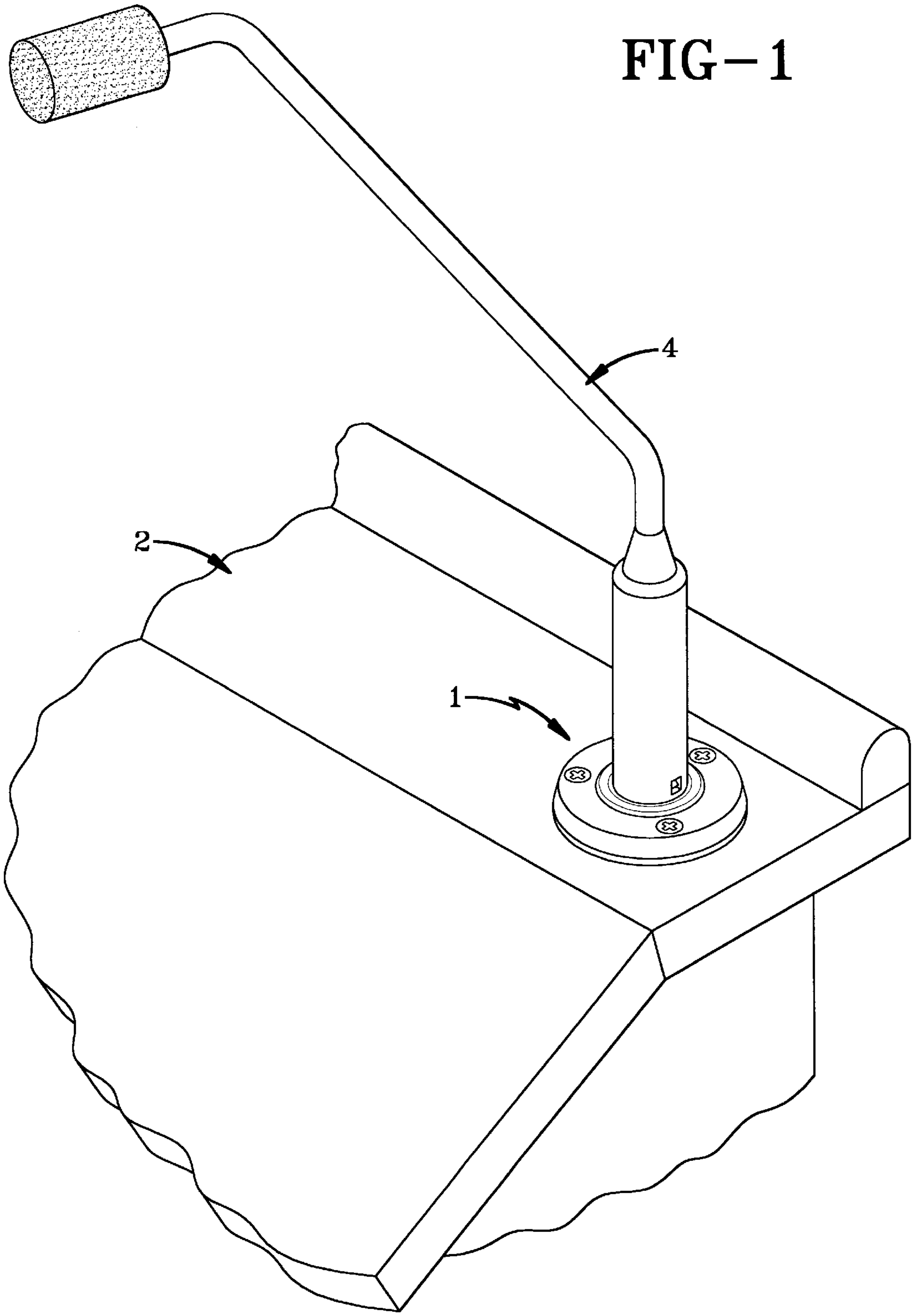
FIG. 1 is a perspective view of the microphone mount of the present invention shown mounted on a podium shown cut-away and holding a gooseneck microphone.
Figure 3:
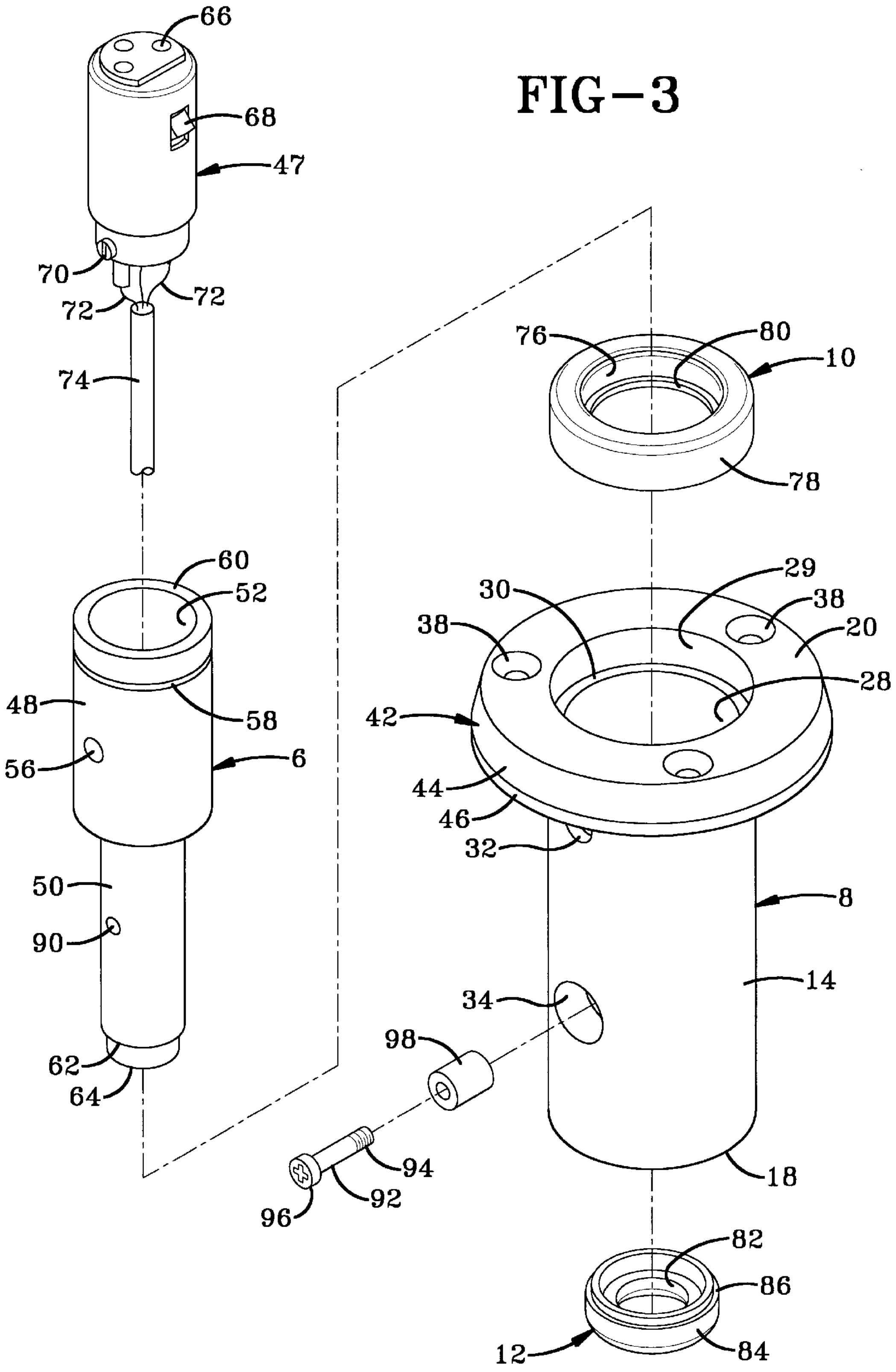
FIG. 3 is an enlarged exploded view of the mount of FIG. 1.

The microphone mount of the present invention is indicated generally at 1 in FIG. 1 and is shown mounted on a podium 2 holding a usual gooseneck microphone 4. Mount 1 generally includes an inner tube housing 6 (FIGS. 3 and 4), an outer tube housing 8 and top and bottom ring-shaped couplings or dampeners 10 and 12, respectively. Housings 6 and 8 are preferably formed of a metal, such as steel, but may be formed of various other materials having similar characteristics without affecting the concept of the invention. Dampeners 10 and 12 are preferably constructed of a elastomeric material, such as rubber, but may be formed of other materials having dampening characteristics similar to that of rubber, without affecting the concept of the invention.

Outer housing 8 has a cylindrical body 14 having a top edge 16 (FIG. 4), a bottom edge 18 and a flange 20 extending radially outwardly from top edge 16. An upwardly facing annular stepped shoulder 24 extends from the inner surface of housing 8 and forms a lower bore 26 and a larger upper bore 28. Lower and upper bores 26 and 28 are formed with openings 27 and 29, respectively.

Two additional stepped shoulders 30 and 31 are formed in the inner surface of body 14 adjacent top and bottom edges 16 and 18, respectively. Stepped shoulder 30 (FIG. 3) faces upwardly and is slightly smaller than stepped shoulder 24 and stepped shoulder 31 (FIG. 4) faces downwardly and is slightly smaller than stepped shoulder 30.

Figure 2:
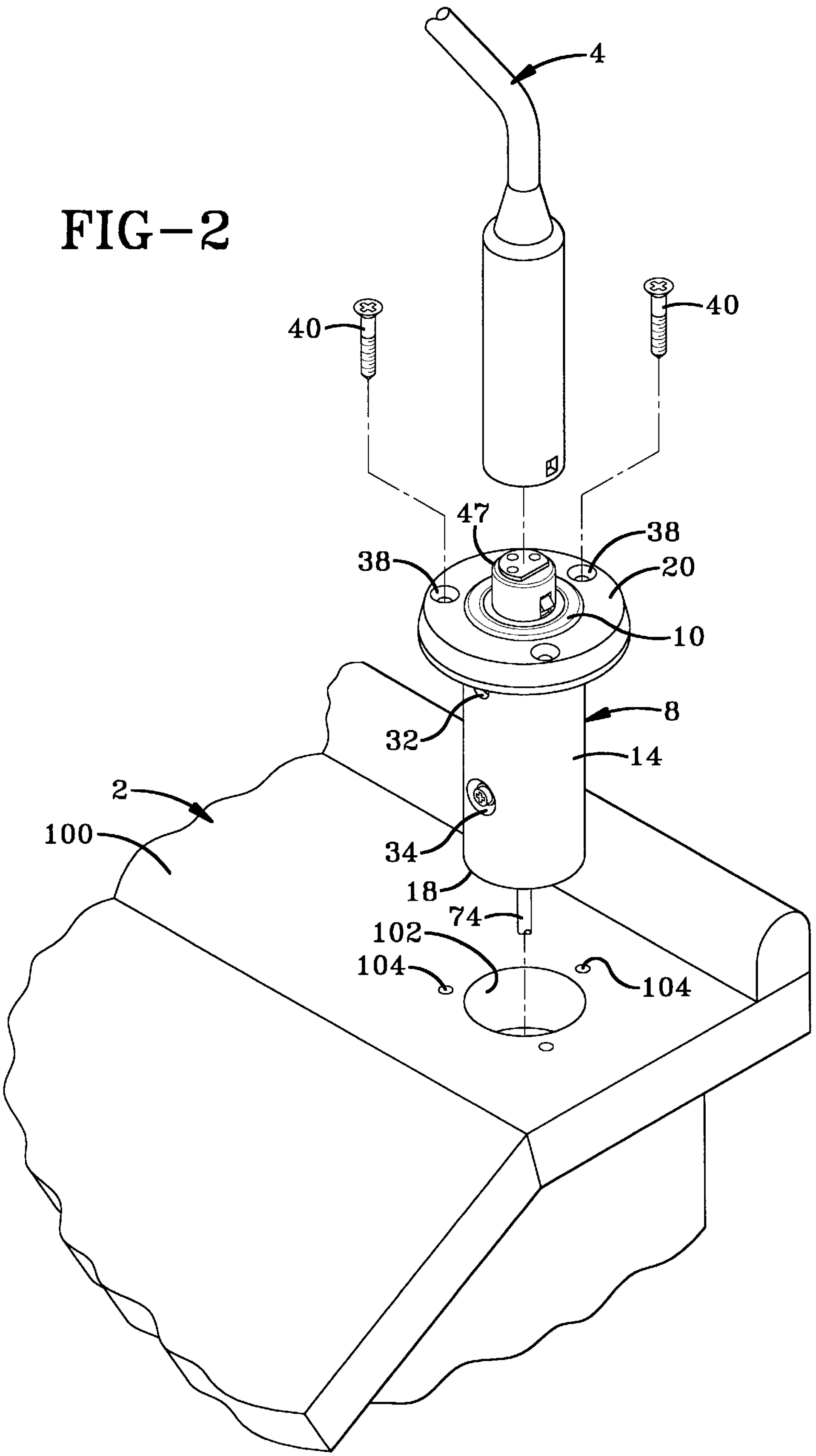
FIG. 2 is a partially exploded fragmentary perspective view of the mount of FIG. 1.

A circular access opening 32 is formed in cylindrical body 14 which communicates with upper bore 28. A circular mounting opening 34 (FIG. 4) is formed below circular opening 32 and stepped shoulder 24 which communicates with lower bore 26. Three circular countersunk holes 38 are formed in flange 20. Each of holes 38 receives a screw 40 (FIG. 2) for securing mount 1 to podium 2, as described below. Flange 20 has a beveled outer edge 42 formed of an outwardly angled portion 44 and a vertically truncated portion 46.

Figure 4:
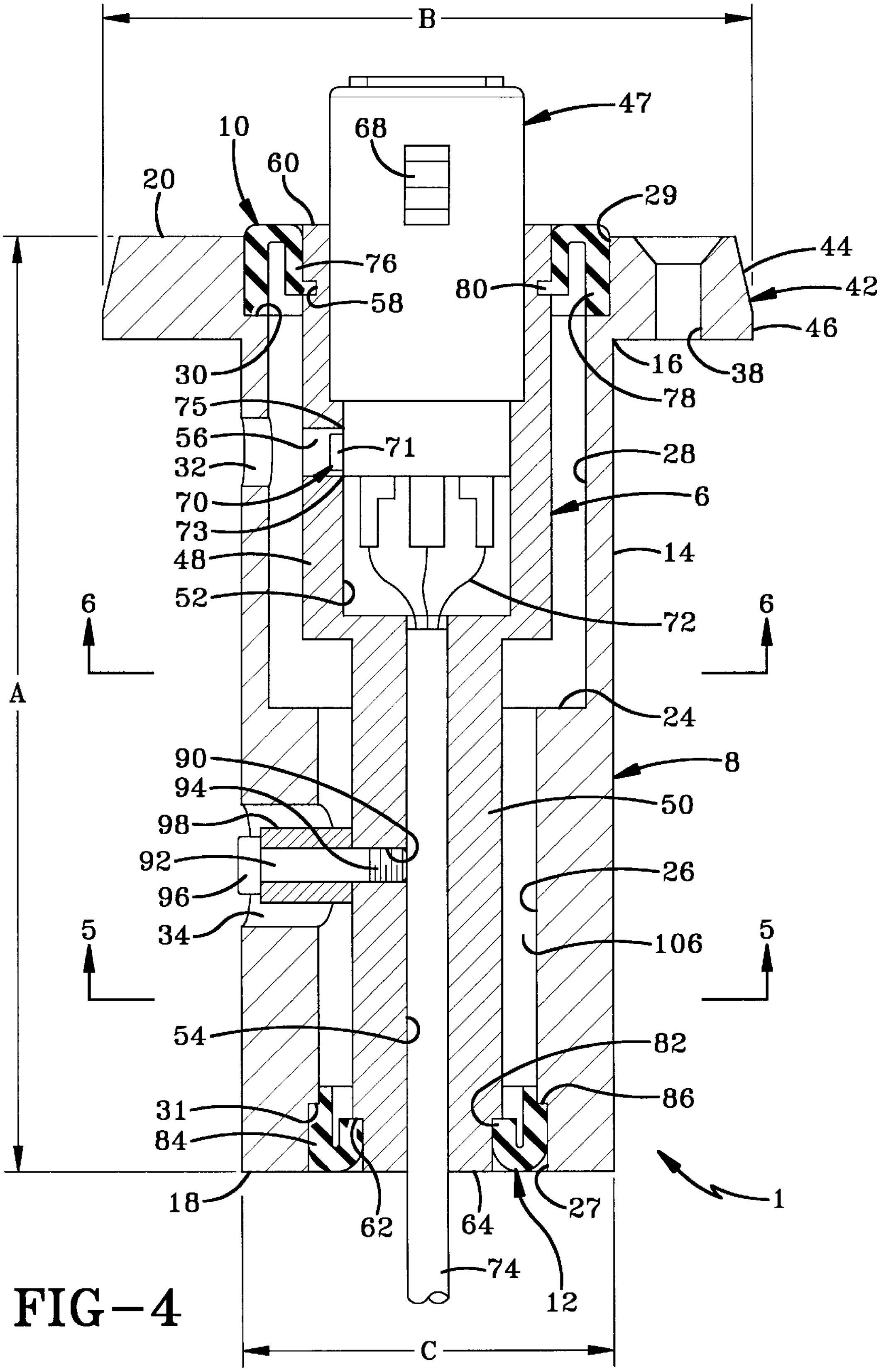
FIG. 4 is a sectional view of the mount of FIG. 3.
Figure 5:
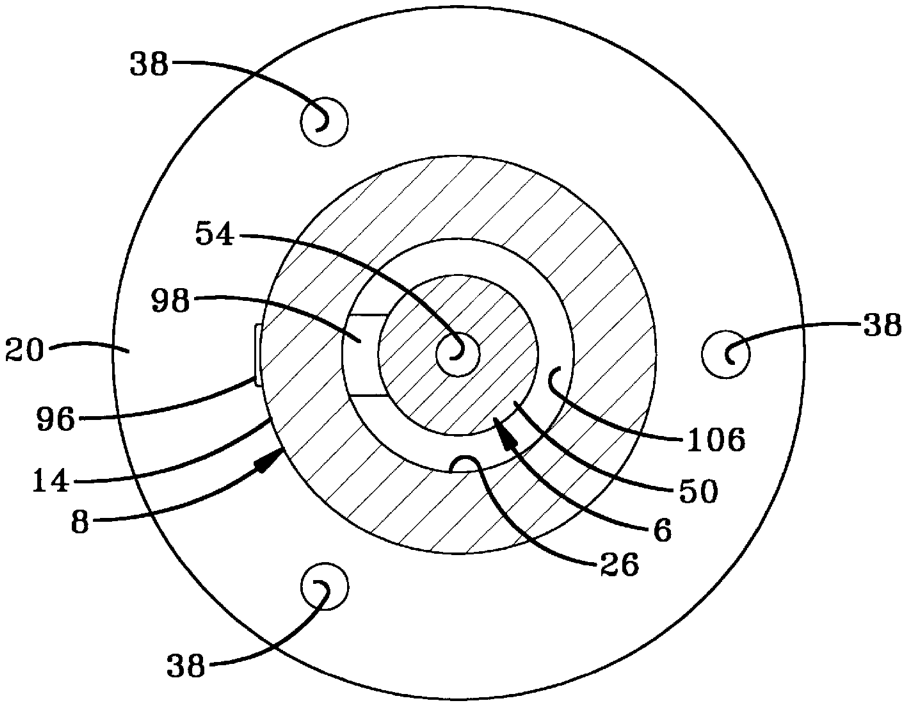
FIG. 5 is sectional view taken along line 5—5, FIG. 4.
Figure 6:
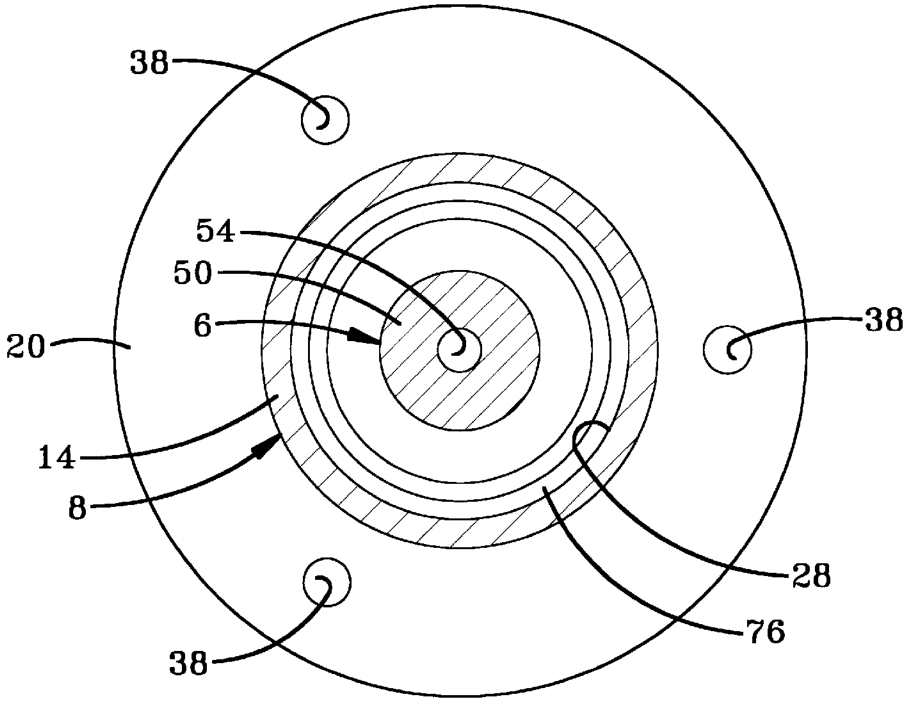
FIG. 6 is a sectional view taken along line 6—6, FIG. 4.

Inner housing 6 holds a usual quick-disconnect connector 47 and includes an upper cylindrical-shaped section 48 connected to a narrower lower cylindrical-shaped section 50. Upper section 48 forms an upper bore 52 and lower section 50 forms a lower narrower bore 54 which communicates and axially aligns with an upper bore 52. A circular opening-56 is formed in upper section 48 which axially aligns with access opening 32 (FIGS. 1 and 4). An annular groove 58 (FIGS. 3 and 4) is formed adjacent a top edge 60 of housing 6 and a downward facing stepped shoulder 62 is formed in a bottom edge 64 of housing 6.

Connector 47 has three female receptacles 66 (FIG. 3) which receive the three pronged male end (not shown) of gooseneck microphone 4. A spring-biased detent 68 is attached to connector 47 for latching and releasing microphone 4 to and from connector 47. An adjustment screw 70 extends from the lower edge of connector 47 and into opening 56 for securing connector 47 within inner housing 6. Adjustment screw 70 is formed with a head 71 and an enlarged middle section 73 having a shoulder 75. Shoulder 75 contacts the inner surface of upper section 48 to retain connector 47 within inner housing 6. Additionally, adjustment screw 70 is left-hand threaded to assure that clockwise rotation causes screw 70 to rotate out of connector 47 and secure connector 47 within inner housing 6. Opening 32 merely provides access to screw 70 through opening 56. Three wires 72 extend from the bottom of connector 47 which converge into a single cable 74. Cable 74 is connected to an amplifier or receiver to output the audio signal of microphone 4 through usual audio speakers.

In accordance with one of the features of the invention, top dampener 10 has a U-shaped cross-section with an inner portion 76, an outer portion 78 slightly longer than inner portion 76 and an annular rib 80 which extends inwardly from inner portion 76. Similarly, bottom dampener 12 has a U-shaped cross-section with an inner portion 82, an outer portion 84 slightly longer than an inner portion 82, and an annular stepped shoulder 86 formed in the outer surface of outer portion 84. Top dampener 10 and bottom dampener 12 are spaced apart in the range of from 2 inches to 6 inches and in the preferred embodiment are spaced apart by approximately 3 inches.

In accordance with another feature of the invention, an internally threaded circular opening 90 is formed in lower section 50 of housing 6 which axially aligns with mounting opening 34 of outer housing 8. A stop pin 92 which has an externally threaded end 94 and an enlarged head 96 extends through opening 34 wherein threaded end 94 thereof engages internally threaded opening 90. A bushing 98 extends around stop pin 92 and engages head 96 thereof when stop pin 92 is tightened into circular opening 90, as described below. Opening 34 is slightly larger than stop pin 92 and bushing 98, and bores 26 and 28 of outer housing 8 are slightly larger than lower and upper cylinders 50 and 48, respectively, of inner housing 6.

In the preferred embodiment, mount 1 has a height "A". (FIG. 4) measured from the top of flange 20 to bottom edge 18 of outer housing 8 of approximately 3⁵⁄₆₄ inches. Flange 20 has an outer diameter "B" of approximately 2⅛ inches and cylindrical body 14 of outer housing 8 has an outer diameter "C" of approximately 1³⁄₁₆ inches.

Mount 1 requires a minimum 3½ inch clearance as measured from a top 100 of podium 2. A circular hole 102 having a diameter of approximately 1¼ inches is drilled in top 100 and mount 1 is temporarily installed therein. Three smaller holes 104 are marked and drilled through holes 38 of flange 20 on top 100 of podium 2. Holes 104 align with holes 38 and receive screws 40 for mounting mount 1 to podium 2.

Mount 1 is shown in FIG. 4 in an assembled position whereby outer housing 8 extends concentrically around inner housing 6 forming a gap 106 therebetween. Upper section 48 of inner housing 6 sits within upper bore 28 of outer housing 8 and lower section 50 of housing 6 sits within lower bore 26 of housing 8. Openings 32 and 34 of outer housing 8 axially align with openings 56 and 90, respectively, of inner housing 6. Bushing 98 extends around stop pin 92 and pin 92 sits within opening 34 to allow externally threaded end 94 of pin 92 to engage the internal threads of opening 90.

Top dampener 10 is positioned around top edge 60 of inner housing 6 within gap 106. Rib 80 of top dampener 10 extends into groove 58 of inner housing 6 and inner portion 76 of top dampener 10 abuts the outer surface of upper section 48 of inner housing 6. Outer portion 78 of top dampener 10 abuts the inner surface of upper bore 28 and engages stepped shoulder 30 of body 14. The engagement of top dampener 10 with stepped shoulder 30 and groove 58 vertically suspends inner housing 6 within outer housing 8 and prevents substantial upward vertical movement thereof.

Bottom dampener 12 is placed in an inverted position within gap 106 between bottom edges 18 and 64 of outer and inner housings 8 and 6, respectively. Inner portion 82 of bottom dampener 12 abuts the outer surface of lower section 50 of inner housing 6 and engages stepped shoulder 62. Outer portion 84 of bottom dampener 12 abuts the inner surface of lower bore 26 wherein stepped shoulder 86 of bottom dampener 12 engages stepped shoulder 31 thereof.

The resiliency of top and bottom dampeners 10 and 12, respectively, and the size of opening 34 relative to stop pin 92 allow outer housing 8 to vibrate slightly in the vertical direction. The resilient dampeners absorb and dampen any external vibrational noise and convert the vibrations into heat energy. Also, the resiliency of the dampeners and the size of bores 26 and 28 of outer housing 8 relative to the respective upper and lower cylinders of inner housing 6 allow outer housing 8 to vibrate slightly in the horizontal direction and further dampen vibrational noise.

Dampeners 10 and 12 function to support inner tube housing 6 and gooseneck microphone 4 while operating as shock absorbers to insulate inner housing 6 and connector 47, and thus microphone 4, from vibrations due to movement of the podium or from external mechanical sources. Dampeners 10 and 12 also provide a dual point suspension which prevents microphone 4 from tipping or leaning while mounted on podium 2. The dampeners act as two pivot points or fulcrums separated in the preferred embodiment by approximately 3 inches, which stabilize the top-heavy gooseneck microphone in a substantially vertical position.

Accordingly, microphone mount 1 mounts and stabilizes gooseneck microphone 4 on podium 2. Outer housing 8 mounts directly to podium 2 and dampeners 10 and 12 suspend inner housing 6 within outer housing 8 to insulate the inner housing from movement of the podium and outer housing, and dampen vibrational noise caused by various external mechanical sources.

Accordingly, the improved microphone mount is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved microphone mount is constructed and used, the characteristics of the construction, and the advantageous, new and useful results obtained; the new and useful structures, devices, elements, arrangements, part and combinations, are set forth in the appended claims.

I claim:

1. A mount for mounting a microphone onto a support surface and for isolating a microphone from mechanical vibration, including:

an inner housing adapted to carry the microphone;

an outer housing extending around at least a portion of the inner housing;

a top dampener and a bottom dampener, the top and bottom dampeners being separate and spaced apart, each of the top and bottom dampeners having an inner member, a connecting member, and an outer member, the inner members attached to the inner housing, the outer members attached to the outer housing, at least a portion one of the top dampener and the bottom dampener having a generally planar configuration, the inner housing being free of contact with the outer housing except for the top and bottom dampeners; and the top and bottom dampeners allowing linear movement of the inner housing relative to the outer housing.

2. The mount as defined in claim 1 in which the top and bottom dampeners are manufactured of an elastomeric material.

3. The mount as defined in claim 2 in which the inner housing includes a top and a bottom; in which the outer housing includes a top and a bottom; and in which the top dampener is positioned adjacent the top of the inner housing and the top of the outer housing and the bottom dampener is positioned intermediate the bottom of the inner housing and the bottom of the outer housing.

4. The mount as defined in claim 3 in which said top and bottom dampeners are spaced apart in the range of from two inches to six inches.

5. The mount as defined in claim 3 in which the inner housing and the outer housing are complementary shaped.

6. The mount as defined in claim 5 in which the inner housing and the outer housing are substantially cylindrical shaped whereby the outer housing extends concentrically around the inner housing.

7. The mount as defined in claim 6 in which the inner and outer housings are separated by a space and in which one of the top and bottom dampeners is annularly shaped and extends radially around the inner and outer housings within the space.

8. The mount as defined in claim 7 in which the annularly shaped dampener is formed with a hole; and in which the inner housing is received within the hole.

9. The mount as defined in claim 7 in which said top and bottom dampeners are ring-shaped.

10. The mount as defined in claim 9 in which each ring-shaped dampener is generally U-shaped in cross section and in which the inner member engages the inner housing and the outer member engages the outer housing.

11. The mount as defined in claim 10 in which each ring-shaped dampener includes engagement means for engaging the inner housing.

12. A mount for mounting a microphone onto a support surface and for isolating a microphone from mechanical vibration, including:

an inner housing adapted to carry the microphone;

an outer housing extending around at least a portion of the inner housing;

a top dampener and a bottom dampener, the top and bottom dampeners being separate and spaced apart, each of the top and bottom dampeners having an inner portion and an outer portion, the inner portions attached to the inner housing, the outer portions attached to the outer housing, at least a portion of one of the top dampener and the bottom dampener having a generally planar configuration;

the inner housing being free of contact with the outer housing except for the top and bottom dampeners;

the top and bottom dampeners allowing the linear movement of the inner housing relative to the outer housing;

the top and bottom dampeners being manufactured of an elastomeric material;

the inner and outer housings each including a top and a bottom, the top dampener being positioned adjacent the top of the inner housing and the top of the outer housing, and the bottom dampener being positioned intermediate the bottom of the inner housing and the bottom of the outer housing;

the inner and outer housings being complementally shaped;

the inner and outer housings being substantially cylindrical in shape whereby the outer housing extends concentrically around the inner housing;

the inner and outer housings being separated by a space;

one of the top and bottom dampeners being annularly shaped and extending radially around the inner and outer housings within the space;

the top and bottom dampeners being ring-shaped;

the top and bottom dampeners being generally U-shaped in cross section, the inner portions engaging the inner housing, and the outer portions engaging the outer housing; and said inner portion including an annular rib extending inwardly therefrom; in which an annular recess is formed in the inner housing an in which the annular rib operatively engages the annular recess.

13. A mount for mounting a microphone onto a support surface and for isolating a microphone from mechanical vibration, including:

an inner housing adapted to carry the microphone;

an outer housing extending around at least a portion of the inner housing;

a top dampener and a bottom dampener, the top and bottom dampeners, being separate and spaced apart, each of the top and bottom dampeners having an inner portion and an outer portion, the inner portions attached to the inner housing, the outer portions attached to the outer housing, at least a portion of one of the top dampener and the bottom dampener having a generally planar configuration;

the inner housing being free of contact with the outer housing except for the top and bottom dampeners;

the top and bottom dampeners allowing linear movement of the inner housing relative to the outer housing;

the top and bottom dampeners being manufactured of an elastomeric material;

the inner and outer housings each including a top and a bottom, the top dampener being positioned adjacent the top of the inner housing and the top of the outer housing, and the bottom dampener being positioned intermediate the bottom of the inner housing and the bottom of the outer housing;

the inner and outer housings being complementally shaped;

the inner and outer housings being substantially cylindrical in shape whereby the outer housing extends concentrically around the inner housing;

the inner and outer housings being separated by a space;

one of the top and bottom dampeners being annularly shaped an extending radially around the inner and outer housings within the space;

the top and bottom dampeners being ring-shaped;

the top and bottom dampeners being generally U-shaped in cross section, the inner portions engaging the inner housing, and the outer portions engaging the outer housing; and a stepped shoulder being formed on the outer housing adjacent the top thereof in which the outer portion of the top dampener engages the stepped shoulder.

14. A mount for mounting a microphone onto a support and for isolating a microphone from mechanical vibration, including:

an inner housing adapted to carry the microphone;

an outer housing extending around at least a portion of the inner housing;

a top dampener and a bottom dampener, the top and bottom dampeners being separate and spaced apart, each of the top and bottom dampeners having an inner portion and an outer portion, the inner portions attached to the inner housing, the outer portions attached to the outer housing, at least a portion of one of the top dampener and the bottom dampener having a generally planar configuration;

the inner housing being free of contact with the outer housing except for the top and bottom dampeners;

the top and bottom dampeners allowing linear movement of the inner housing relative to the outer housing;

the top and bottom dampeners being manufactured of an elastomeric material;

the inner and outer housings each including a top and a bottom, the top dampener being positioned adjacent the top of the inner housing and the top of the outer housing, and the bottom dampener being positioned intermediate the bottom of the inner housing and the bottom of the outer housing;

the inner and outer housings being complementally shaped;

the inner and outer housings being substantially cylindrical in shape whereby the outer housing extends concentrically around the inner housing;

the inner and outer housings being separated by a space;

one of the top and bottom dampeners being annularly shaped and extending radially around the inner and outer housings within the space;

the top and bottom dampeners being ring-shaped;

the top and bottom dampeners being generally U-shaped in cross section, the inner portions engaging the inner housing, and the outer portions engaging the outer housing; and a stepped shoulder being formed on the outer housing adjacent the bottom thereof wherein the outer portion of the bottom dampener engages the stepped shoulder.

15. A mount for mounting a microphone onto a support surface and for isolating a microphone from mechanical vibration, including:

an inner housing adapted to be mounted to the microphone;

an outer housing extending around at least a portion of the inner housing;

a space extending intermediate the inner housing and the outer housing;

dampening means for isolating the microphone from vibration mounted intermediate the inner housing and the outer housing and within the space; and a stop extending outwardly from the inner housing; in which the outer housing includes a recess; and in which the stop extends into the recess for limiting the vertical movement of the inner housing.

16. The mount as defined in claim 15 in which the recess is larger than the stop to allow the stop to move vertically within the recess.

17. The mount as defined in claim 16 in which the stop includes a pin and bushing, and in which the bushing is sized to fit within the recess.

18. The mount as defined in claim 15 in which the inner housing may move horizontally relative to the outer housing by a distance equal to the width of the space.

19. The mount as defined in claim 1 in which the inner housing is supported by said top and bottom dampeners, and in which the mount is free of other interconnecting members extending between the inner and outer housings.

20. The mount as defined in claim 1 in which the outer housing includes a flange adapted for lying adjacent the support surface.

21. A mount for mounting a microphone onto a support surface and for isolating a microphone from mechanical vibration, including:

an inner housing adapted to carry the microphone;

an outer housing extending around at least a portion of the inner housing;

a top dampener and a bottom dampener, the top and bottom dampeners being separate and spaced apart, each of the top and bottom dampeners having an inner portion and an outer portion, the inner portions attached to the inner housing, the outer portions attached to the outer housing, at least a portion of one of the top dampener and the bottom dampener having a generally planar configuration;

the inner housing being free of contact with the outer housing except for the top and bottom dampeners;

the top and bottom dampeners allowing linear movement of the inner housing relative to the outer housing; and the inner housing including a 3-pin connector; in which the 3-pin connector is adapted to mount a microphone.

22. A mount for mounting a microphone onto a support surface and for isolating the microphone-from mechanical vibration, said mount comprising:

an inner housing adapted to be mounted to the microphone, said inner housing including a top and a bottom;

an outer housing extending around at least a portion of said inner housing, said outer housing including a top and a bottom;

a space extending intermediate said inner housing and said outer housing;

dampening means for isolating the microphone from vibration mounted intermediate said inner housing and said outer housing and within said space, said dampening means including a top dampening means positioned adjacent said top of said inner housing and said top of said outer housing and a bottom dampening means positioned intermediate said bottom of said inner housing and said bottom of said outer housing for isolating vibration from the microphone;

said dampening means being manufactured of an elastomeric material;

said inner housing and said outer housing being complementary shaped;

said inner housing and said outer housing being substantially cylindrical, said outer housing extending concentrically around said inner housing;

said top and bottom dampening means being ring-shaped;

said top and bottom dampening means also being generally U-shaped in cross section and including an outer portion which engages said inner housing and an outer portion which engages said outer housing; and a stepped shoulder being formed on said inner housing adjacent said bottom thereof and wherein said inner portion of said bottom dampening means engages said stepped shoulder.

23. The mount as defined in claim 1 wherein the dampener having the portion of generally planar configuration includes a first surface and a second surface; at least a portion of said first and second surfaces being substantially parallel.

24. The mount as defined in claim 23 wherein the dampener having a portion of the first and second surfaces being substantially parallel has a U-shaped cross section.

25. A mount for mounting a microphone onto a support surface and for isolating the microphone from mechanical vibration; the mount comprising:

an inner housing adapted to carry the microphone;

the inner housing having a top and a bottom;

an outer housing extending around at least a portion of the inner housing;

the outer housing having a top and a bottom;

a top dampener and a bottom dampener, the top and bottom dampeners being separate and spaced apart, each of the top and bottom dampeners having an inner member, a connecting member, and an outer member, the inner members attached to the inner housing, the outer members attached to the outer housing, the inner, connecting, and outer members of the top and bottom dampeners being in a generally U-shaped configuration;

the inner housing being free of contact with the outer housing except for the top and bottom dampeners; and the top and bottom dampeners allowing linear movement of the inner housing relative to the outer housing.

26. The mount as defined in claim 25 wherein each of the top and bottom dampeners is ring-shaped.

27. A mount for mounting a microphone onto a support surface and for isolating the microphone from mechanical vibration; the mount comprising:

an inner housing adapted to carry the microphone;

the inner housing having a top and a bottom;

an outer housing extending around at least a portion of the inner housing;

the outer housing having a top and a bottom;

a top dampener and a bottom dampener, the top and bottom dampeners being separate and spaced apart, each of the top and bottom dampeners having an inner portion and an outer portion, the inner portions attached to the inner housing, the outer portion attached to the outer housing, the top and bottom dampeners each having a generally U-shaped cross section;

the inner housing being free of contact with the outer housing except for the top and bottom dampeners;

the top and bottom dampeners allowing linear movement of the inner housing relative to the outer housing;

each of the top and bottom dampeners being ring-shaped; and a stepped shoulder being formed on the top and bottom of each of the inner and outer housings; each of the dampeners engaging a stepped shoulder.

28. The mount as defined in claim 27 further comprising a stop extending outwardly from the inner housing; the outer housing including a recess; the stop extending into the recess for limiting the vertical movement of the inner housing.

29. The mount as defined in claim 28 wherein the recess is larger than the stop to allow the stop to move vertically within the recess.

* * * * *